United States Patent [19]
Bennett

[11] Patent Number: 5,610,745
[45] Date of Patent: Mar. 11, 1997

[54] METHOD AND APPARATUS FOR TRACKING BUFFER AVAILABILITY

[75] Inventor: Dwayne Bennett, Scarborough, Canada

[73] Assignee: Hewlett-Packard Co., Palo Alto, Calif.

[21] Appl. No.: 548,505

[22] Filed: Oct. 26, 1995

[51] Int. Cl.[6] .......................... H04J 14/08; H04Q 11/04
[52] U.S. Cl. ..................... 359/139; 359/117; 370/232; 370/236
[58] Field of Search ........................ 359/117, 118, 359/128, 139; 370/17, 60, 60.1

[56] References Cited

U.S. PATENT DOCUMENTS

| 5,126,999 | 6/1992 | Munter et al. ................. 370/60 |
| 5,130,975 | 7/1992 | Akata ............................... 370/60 |
| 5,136,582 | 8/1992 | Firoozmand .................... 370/85.1 |
| 5,185,736 | 2/1993 | Tyrrell et al. ................... 370/55 |
| 5,247,626 | 9/1993 | Firoozmand .................... 395/250 |
| 5,255,266 | 10/1993 | Watanabe et al. ............. 370/60.1 |
| 5,291,481 | 3/1994 | Doshi et al. .................... 370/60 |
| 5,313,582 | 5/1994 | Hendel et al. .................. 395/250 |
| 5,357,506 | 10/1994 | Sugawara ........................ 370/60 |
| 5,365,522 | 11/1994 | Peeters ............................ 370/60.1 |
| 5,384,773 | 1/1995 | Olnowich et al. ............. 370/60.1 |
| 5,390,184 | 2/1995 | Morris ............................. 370/94.2 |
| 5,418,779 | 5/1995 | Yemini et al. .................. 370/54 |
| 5,436,894 | 7/1995 | Wallmeier et al. ............ 370/60.1 |
| 5,509,001 | 4/1996 | Tachibana et al. ............ 370/17 |
| 5,519,695 | 5/1996 | Purohit et al. ................. 359/117 |
| 5,528,584 | 6/1996 | Grant et al. .................... 359/117 |

OTHER PUBLICATIONS

Kumar Malavalli & Bent Stoevhase; "Distributed Computing With Fibre Channel Fabic" Canstar, 3900 Victoria Park Ave., N. York, Ontario, Canada; Publication Date :Feb. 24, 1992, Institute of Electrical and Electronics Engineers, Inc. –Digest of Papers –Spring Compcon 92.

*Primary Examiner*—Wellington Chin
*Assistant Examiner*—Kinfe-Michael Negash
*Attorney, Agent, or Firm*—Richard F. Schuette

[57] ABSTRACT

The invention is a method and apparatus for transmitting frames from a plurality of node ports (N_ports) to their associated fabric ports (F_ports) for forwarding to other interconnected F_ports on a Fibre Channel switch in which the transmitted frames are stored in a plurality of receive buffers at the associated F_port prior to forwarding to an interconnected F_port, and a receive credit counter, a smart credit counter and a transmit credit counter are employed for tracking the availability of the receive buffers.

16 Claims, 6 Drawing Sheets

METHOD AND APPARATUS FOR TRACKING BUFFER AVAILABILITY

FIELD OF THE INVENTION

The present invention relates to methods and apparatus for tracking the availability of a memory buffer within a fibre channel network port.

BACKGROUND OF THE INVENTION

Mainframes, super computers, mass storage systems, workstations and very high resolution display subsystems are frequently connected together to facilitate file and print sharing. Common networks and channels used for these types of connections may limit system performance by placing restraints on data flow rates, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions One type of communications interconnect that has been developed is Fibre Channel. The Fibre channel protocol was developed and adopted as the American National Standard for Information Systems (ANSI). See *Fibre Channel Physical and Signaling Interface,* Revision 4.2, American National Standard for Information Systems (ANSI) (1993) for a detailed discussion of the fibre channel standard. Briefly, fibre channel is a switched protocol that allows concurrent communication among workstations, super computers and various peripherals. Fibre channel is capable of transmitting frames at rates exceeding 1 gigabit per second in both directions simultaneously. It is also able to transport commands and data according to existing protocols such as Internet protocol (IP), small computer system interface (SCSI), high performance parallel interface (HIPPI) and intelligent peripheral interface (IPI) over both optical fiber and copper cable.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection device known as a fibre channel switch to connect devices. The fibre channel switch includes a plurality of fabric-ports (F_ports) that provide for interconnection and frame transfer between a plurality of node-ports (N_ports) attached to associated devices that may include workstations, super computers and/or peripherals. The fibre channel switch has the capability of routing frames based upon information contained within the frames. The N_port manages the simple point-to-point connection between itself and the fabric. The type of N_port and associated device dictates the rate that the N_port transmits and receives data to and from the fabric. Transmission is isolated from the control protocol so that different topologies (e.g., point-to-point links, rings, multidrop buses, cross point switches) can be implemented.

The Fibre Channel industry standard also provides for several different types of data transfers. A class 1 transfer requires circuit switching, i.e., a reserved data path through the network switch, and generally involves the transfer of more than one frame, oftentimes numerous frames, between two identified network elements. In contrast, a class 2 transfer requires allocation of a path through the network switch for each transfer of a single frame from one network element to another.

Frame switching for class 2 transfers is more difficult to implement than class 1 circuit switching as frame switching requires a memory mechanism for temporarily storing incoming frames prior to their routing to another port. A memory mechanism typically includes numerous input/output (I/O) connections with associated support circuitry. Additional complexity and hardware is required when channels carrying data at different bit rates are to be interfaced.

The allocation of receive buffers on the F_port is typically dictated by the maximum number of frames that the N_port can send to the F_port without an indication that additional receive buffers are available. Unfortunately, a fibre channel switch may be waiting to forward frames to a destination N_port that is currently busy and will not be able to accept additional frames which would be otherwise routable. It would be advantageous if the N_port could send frames to the fibre Channel switch even if the maximum number of frames received by the fibre channel switch has reached a defined maximum value.

SUMMARY OF THE INVENTION

In accordance with the preferred embodiment of the present invention, a fibre channel switch is provided for interconnecting a plurality of devices (workstations, supercomputer, peripherals) through their associated node ports (N_ports). The fibre channel switch provides a fabric having a plurality of interconnected fabric ports (F_ports). Each N_port comprises a transmit credit counter for counting the number of frames that the N_port is currently allowed to transmit to the F_port. The transmit credit counter is decremented by one after each frame is transmitted and incremented by one upon the receipt of a receiver ready signal from the F_port indicating that the F_port is ready to receive another frame.

Each F_port comprises a plurality of receive buffers for storing frames received from an N_port, a receive credit counter for counting the number of frames that the N_port is currently allowed to transmit at one time for temporary storage while waiting to be forwarded to another F_port, and a smart credit counter for counting the number of receive buffers available to receive frames from the N_port.

The N_port is only allowed to transmit a frame to the F_port if the N_ports transmit credit counter is greater than 0. The transmit credit counter is initialized at login at a number corresponding to the maximum number of frames that the N_port can transmit to the F_port without receiving a receiver ready signal from the F_port indicating that a receive buffer is available. The receive credit counter on the F_port (rx_bb_credit) is decremented upon the receipt of a frame from the N_port and incremented upon the forwarding of a frame to another F_port (at which point the F_port generates and sends a receiver ready signal to the N_port).

The receive credit counter is also initialized at login with an initial value defined as the login receive buffer-to-buffer credit (login rx_bb_credit) corresponding to the maximum number of frames that the N_port can transmit to the F_port at one time.

The smart credit counter counts the total number of receive buffers available on the F_port and typically exceeds the number of frames that the N_port can send at one time. The difference between the initial value of the smart credit counter and the initial value of the receive credit counter is the number of spare buffers on the F_port.

Frames are received by an F_port and forwarded to a destination F_port when the path allocation system indicates that a path is available. Upon receipt of the frame, the current value of the smart credit counter for the receiving F_port and the receive credit counter are compared, if the smart credit counter value is greater than the initial value of the receive credit counter (indicating that spare buffers are available to receive additional frames) a receiver ready signal is sent immediately to the N_port, incrementing the transmit credit counter and enabling the N_port to send an extra frame. The smart credit counter is then decremented by one indicating the availability of one less extra receive buffer.

If the value of the smart credit counter is less than or equal to the initial value of the receive credit, then the number of available buffers is limited to the count of the first counter and no extra receive buffers are available. Both the receive credit counter and the smart credit counter are decremented by one upon receipt of the frame. In this situation, the receiver ready signal is only generated and sent to the N_port upon forwarding the frame to another F_port.

Additionally, the F_port receive buffer is deallocated upon the forwarding of a frame from the receive buffer to a destination N_port. In particular, the receive credit counter is compared to its login value and if the current count of the receive credit counter is less than its login value, then both the receive credit counter and the smart credit counter are incremented by one, and a receiver ready signal is generated and sent to the N_port (incrementing the transmit counter). If the current count of the receive credit counter is equal to its login value, then the value of the receive credit counter is maintained and only the smart credit counter is incremented by one. No receiver ready signal is generated as the transmit credit count is already at its maximum value.

Other aspects and advantages of the present invention will be come apparent from the following detailed description, taken in conjunction with the accompanying drawings, illustrating by way of example the principles of the invention.

DETAILED DESCRIPTION OF THE PREFERRED EMBODIMENTS

I. FIBRE CHANNEL SWITCH ARCHITECTURE

Figure 1:
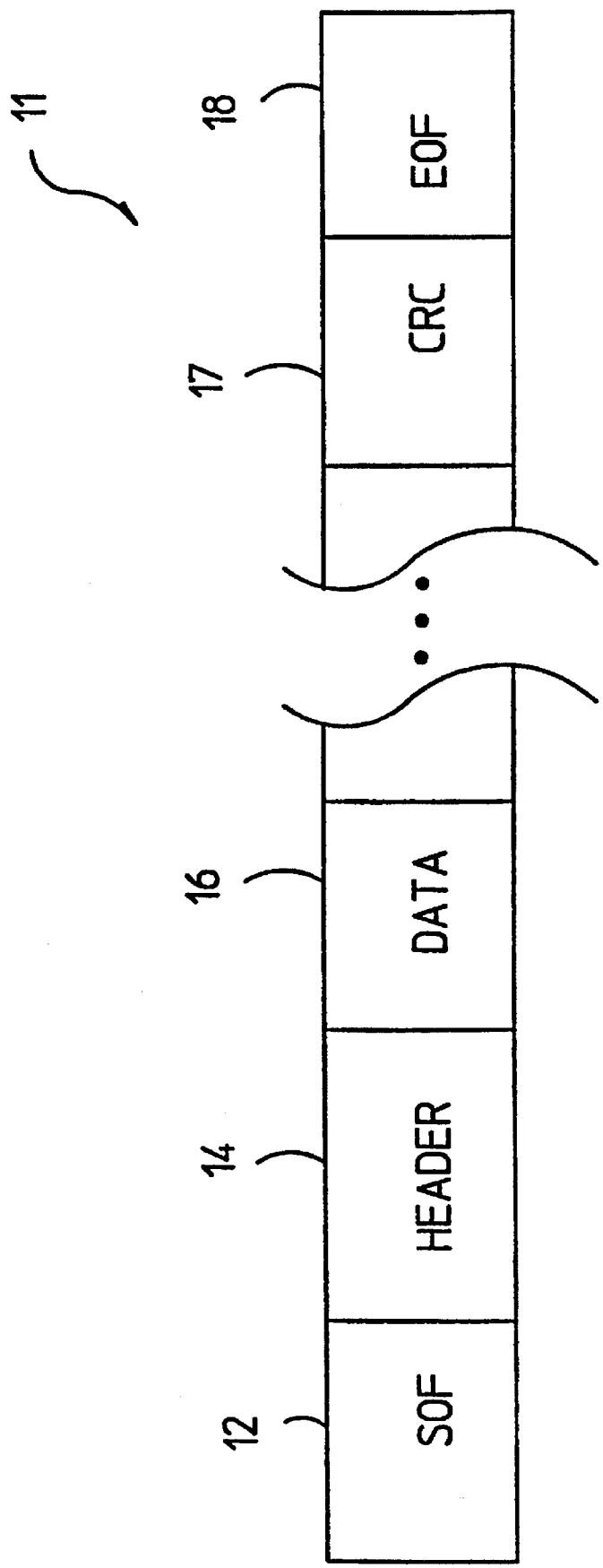
FIG. 1 is a schematic diagram of a prior art variable-length frame communicated through a fiber optic network in accordance with the Fibre Channel industry standard.

With reference now to the drawings wherein like reference numerals designate corresponding parts throughout the several views, a variable-length frame 11 is illustrated in FIG. 1. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

Figure 2:
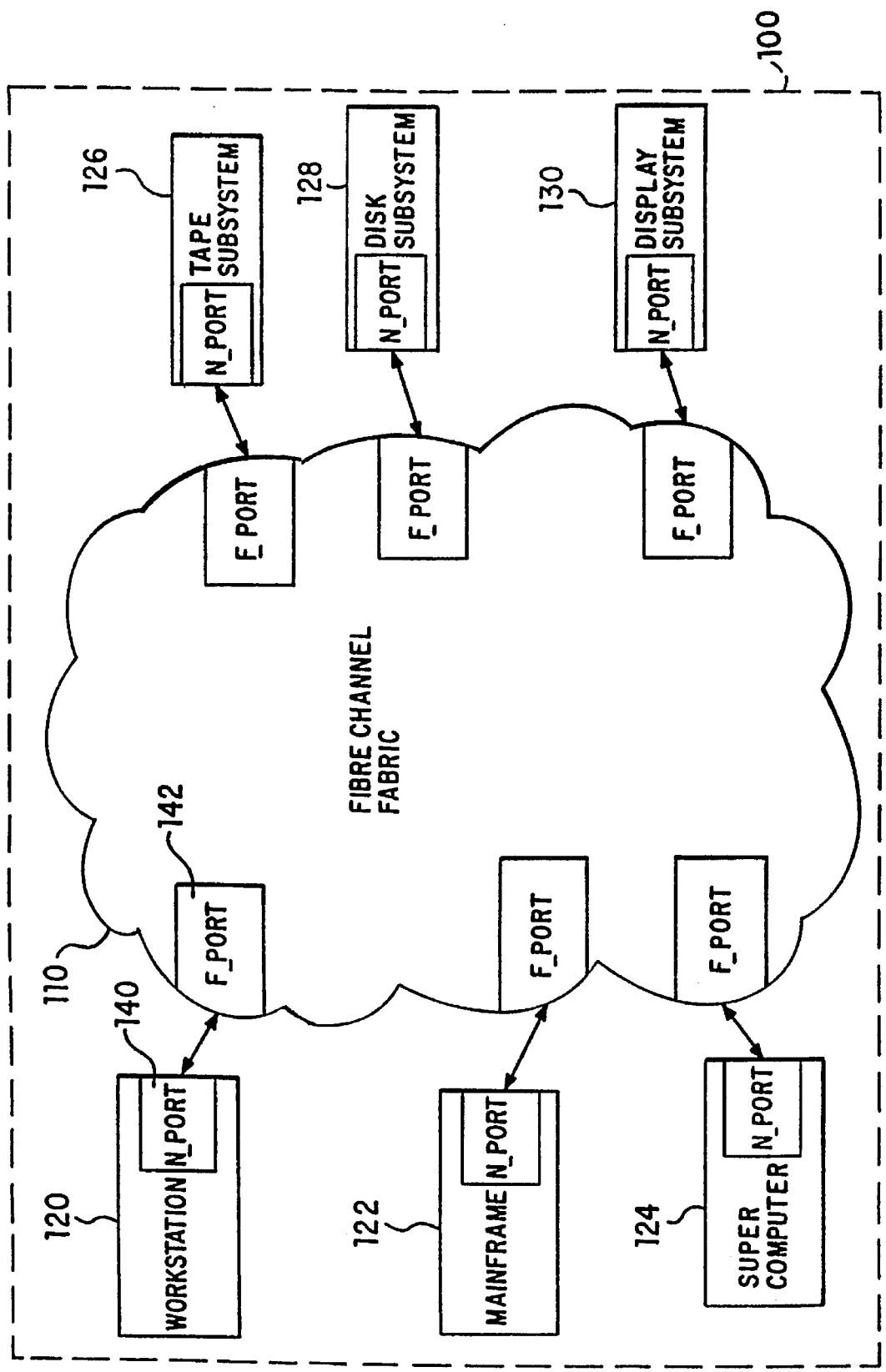
FIG. 2 shows a block diagram of a representative prior art Fibre Channel architecture.

FIG. 2 illustrates a block diagram of a representative prior art fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e. fibre channel switch). The fabric 110 is an entity that interconnects various node-ports (N_ports) and their associated workstations, mainframes and peripherals attached to the fabric 110 through the F_ports. The essential function of the fabric 110 is to receive frames of data from a source N_port and, using a first protocol, route the frames to a destination N_port. In a preferred embodiment, the first protocol is the fibre channel protocol. Other protocols, such as the asynchronous transfer mode (ATM) could be used without departing from the scope of the present invention.

As used herein, these terms and phrases are defined as follows:

Class 1 service—a circuit-switched connection;

Class 2 service—a frame-switched service providing guaranteed delivery and receipt notification;

Class 3 service—a frame-switched service with no confirmation;

F_port—"fabric" port, the access point of the Fabric that an N_port physically connects;

Fabric—a Fibre Channel-defined interconnection that handles routing in Fibre Channel networks;

Frame—a linear set of transmitted bits that define a basic transport element;

Intermix—a class of service that provides functionality of both Class 1 and 2, Intermix reserves the full channel for a Class 1 connection while allowing Class 2 traffic to pass on unused bandwidth;

Link—a communications channel;

N_port—"node" port, a Fibre Channel-defined hardware entity at the node end of a link.

Figure 3:
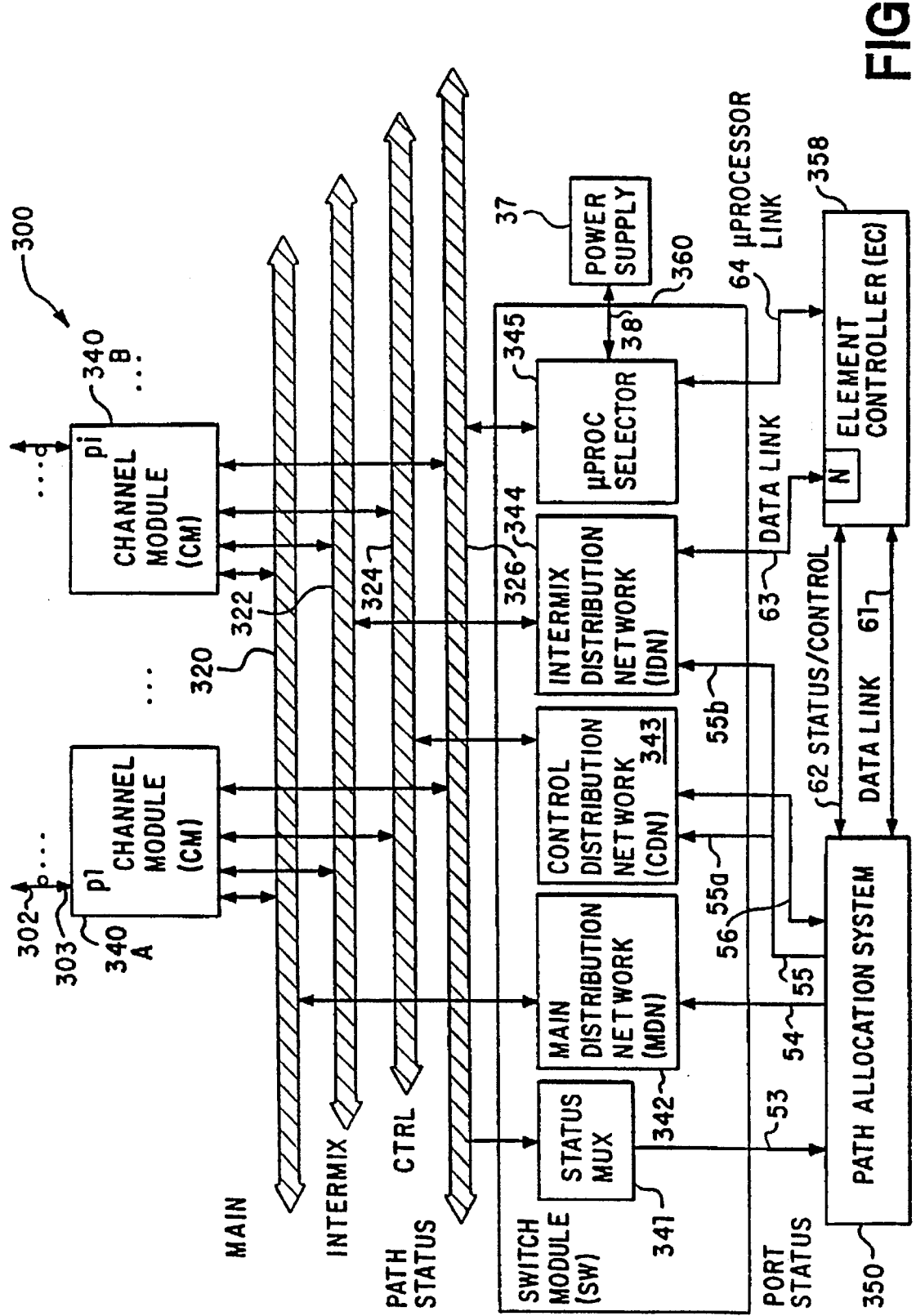
FIG. 3 is a schematic circuit diagram of the preferred embodiment of the invention illustrating a high performance fiber optic switch that utilizes a plurality of channel modules.

The fibre channel switch 300 illustrated in FIG. 3 employs a plurality of channel modules 340. Although FIG. 3 illustrates two channel modules 340 A and 340 B, the number of channel modules 340 may be greater than illustrated and is typically dependent upon system configuration. In a first embodiment, the fibre channel switch has four (4) channel module cards, each containing four 266 MBaud F_ports (providing for the interconnection of sixteen F_ports and associated computers and peripherals). The architecture provides for the substitution of the four 266 Mbaud channel module cards with either dual port 531 Mbaud channel module cards or a single port 1063 MBaud channel module. Each channel module 340 is coupled directly to a main link 320, an intermix link 322, a control link 324 and a path status link 326. Control signals over the control link 324 direct the transfer of frames received by one channel module 340 to a different port on the same channel module or to any other available channel module 340. The channel modules 340 provide port intelligence for data communication with the channels, buffered receive memory for temporarily storing frames for class 2 data transfers, as well as a bypass such that incoming frames are not buffered during class 1 data transfers. A path allocation system 350 communicates with the channel modules 340 through a switch module 360.

For frame-switched traffic (class 2), the path allocation system 350 collects frame header information for each frame from the receiving ports of channel module 340. The path allocation system 350 verifies the validity of the frame header information and allocates switch resources to set up a path for the frame, through the switch to the destination port. Once the frame has been forwarded, the path allocation system 350 de-allocates the switch resources.

The path allocation system 350 also collects frame header information for circuit switched traffic (Class 1 connect frames) from the channel modules 340. The path allocation system 350 then verifies the validity of the connection and allocates switch resources to set up a dedicated path for the connection to follow. The connection traffic itself will deallocate resources.

Figure 4:
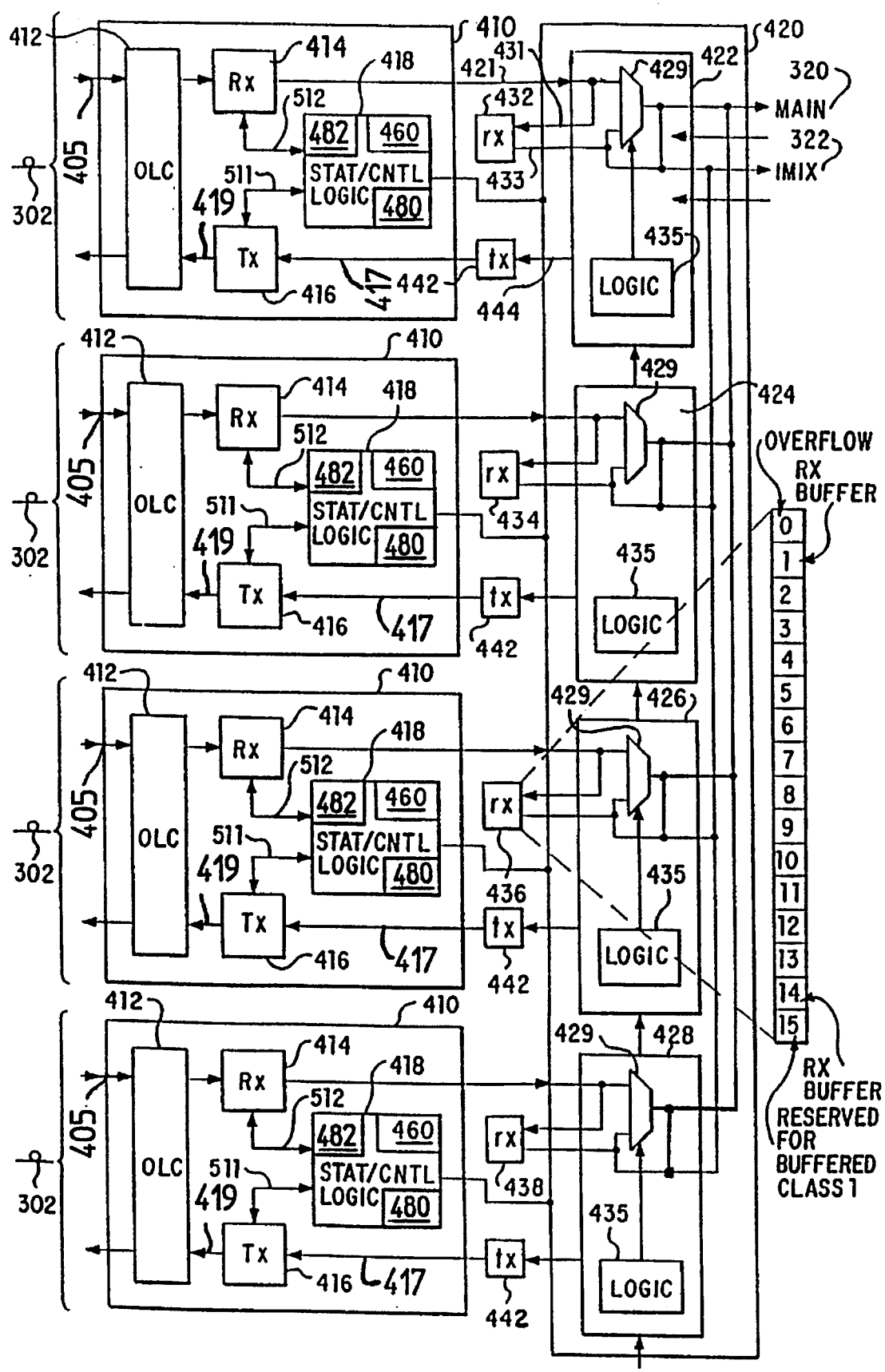
FIG. 4 shows a block diagram of one of the channel modules of FIG. 3.

FIG. 4 shows a block diagram of the channel module architecture for a quad port, 266 Mbaud channel module comprising four port intelligence systems 410 and a memory interface system 420 having four memory interface ASIC's 422, 424, 426 and 428. The architecture for a double port, 531 Mbaud channel module implementation would be similar, except that the 531 implementation employs two port intelligence modules 410. The architecture for a single port, 1062 Mbaud channel module implementation would be similar, except that the 1062 implementation employs four channel modules 410 coupled to the memory interface systems.

Each port intelligence system 410 is coupled to external N_ports through a GLM/OLC transceiver 412. Incoming frames are transferred by the GLM/OLC transceiver 412 to a receiver 414. Status/control logic circuit 418 recognizes when a new frame is received by the receiver 414 and determines the transfer class (either 1 or 2) as well as the length of data from the received frame header information attached to the frame. The purposes of the receiver 414 are to: maintain synchronization with the attached N_port; decode incoming transmission characters, to manage buffer-to-buffer flow control; gather statistics to evaluate link performance; re-time the system clock; detect, check, and validate frames; and forward all frames to the memory interface system 420 for temporary storage in associated receive memory 432, 434, 436 and 438.

The memory interface system 420, in response to commands from the port intelligence system 410 and the path allocation system 350, employs the four memory interface ASIC's 422, 424, 426 and 428 to interface four receive memories 432, 434, 436 and 438 (16k×16 external RAM) to internal switch data paths via the main bus 320 and imix bus 322. Frames transmitted across receive data path 421 between the port intelligence system 410 and the memory interface system 420 are bit sliced such that memory interface 422 receives bits 0–1, memory interface 424 receives bits 2–3, memory interface 426 receives bits 4–5 and memory interface 428 receives bits 6–7. Each memory interface knows its position and the baud rate at which the channel module 340 is operating. Frames read from receive memories 422, 424, 426 and 428 are reassembled to become byte-wide for traversing the fibre channel switch on the main bus 320 and imix bus 322.

A transmitter 416 is coupled between the memory interface system 420 and the GLM/OLC transceiver 412 and transmits frames that have been forwarded from other channel module receive memories within the fibre channel switch for encoding and transmission according to fibre channel rules. A 4k×9 FIFO transmit memory 442 is coupled between the memory interface 420 and the transmitter 416 for interfacing the main bus 320 and imix bus 322 to the port intelligence system 410. The memory interface 420 outputs bit-sliced data that is reformed on the transmit data path 444 at the input of the transmit memory 442.

Each memory interface 422, 424, 426 and 428 includes a multiplexer 429 for providing class 1 data bypass via connection 431 and buffered storage for class 2 data transfers via connection 433 to the receive memory. Additionally, each memory interface includes a memory control logic 435 for controlling the multiplexers 429, the receive memories 432, 434, 436, 438 and the transmit memory 442 in response to commands from the port intelligence system 410 and the path allocation system 350 (FIG. 3).

Each receive memory 432, 434, 436 and 438 is comprised of a set of sixteen memory buffers numbered 0–15 (illustrated in the expanded portion 440 of FIG. 4), each having a storage capacity of two kbytes. Memory buffers numbered 1 through 14 are designated for frame transfers of class 2, memory buffer numbered 15 is reserved for class 1 frames destined for the embedded N_port on the element controller 358 (FIG. 3), and memory buffer number 0 is reserved for overflow. A maximum size frame in accordance with the Fibre Channel industry standard is 2148 bytes long. A binary addressing scheme "PPbbbbxxxxxxxx" is employed for the fourteen memory buffers numbered 1–14 and PP1111bbbbxxxx for the overflow memory buffer numbered 0, where PP identifies the F_port from which the frame is being transferred and bbbb identifies the memory buffer number at which it currently resides.

The status/control logic 418 (FIG. 4) employs a receive credit counter (receive buffer-to-buffer credit counter) 480 and a smart credit counter 482 for tracking the availability of each F_port's plurality of receive buffers. The N_port 140 (FIG. 2) includes a transmit credit counter 142. The receive credit counter 480 is initialized at login with an initial value ("login rx bb credit") corresponding to the maximum number of frames that a device coupled to an N_port is allowed to transmit to the associated F_port at one time. The transmit credit counter 142 (see FIG. 2) is initialized at a value equal to the login receive buffer to buffer credit, and the N_port must have a transmit credit greater than 0 before a frame can be transmitted. The transmit credit counter is decremented whenever a frame is transmitted from the N_port to the F_port. The smart credit counter 482 counts the number of receive buffers available on the F_port and is initialized at a value not to exceed the total number of buffers on the F_port.

The invention helps to ensure that the N_port is not a limiting factor in the number of frames the N_port can transmit at one time. In particular, the invention takes advantage of the spare receive buffers on the F_port that are available to receive frames, but exceed the maximum number of frames that the device associated with the N_port can transmit to the F_port at one time.

Figure 5:
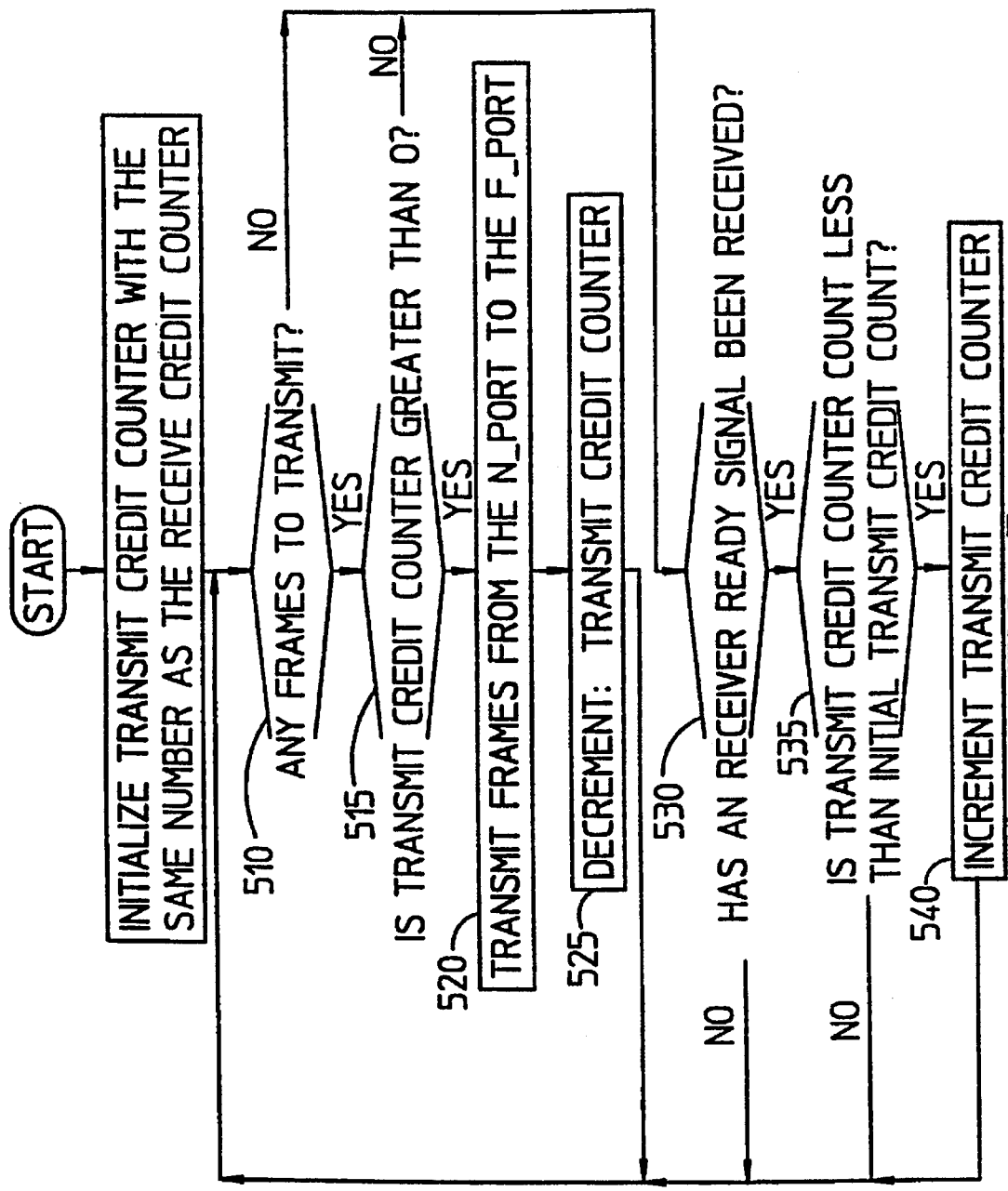
FIG. 5 shows a flow chart of the smart credit method for tracking buffer availability in accordance with the preferred embodiment of the invention from the perspective of the N_port.

FIG. 5 is a flow chart illustrating the smart credit method for tracking buffer availability from the N_port's perspective. At system login, the transmit credit counter is initialized at a value corresponding to the maximum number of frames the N_port is allowed to send to the F_port without receiving a receiver ready signal from the F_port (step 505). At step 510, a determination is made as to whether the N_port has any frames to transmit. If yes, a determination must be made as to whether the transmit credit counter is greater than (step 515). If yes, then the frame is transmitted to the F_port (step 520), the transmit credit counter is decremented at step 525 and a determination is made whether there are any frames to transmit (return to step 510). If there are no frames to transmit, or if the there are frames to transmit and the transmit credit counter is not greater than 0 (step 515), then a determination is made whether a receiver ready signal has been received by the N_port (step 530). If no receiver ready signals have been received, then there is a return to step 510. If a receiver ready signal has been received, then at step 535, a determination is made as to whether the transmit credit counter count is greater than the initial transmit credit count, if no, then at step 540, the transmit credit counter is incremented and there is a return to step 510. If yes, then there is a direct return to step 510 as the transmit credit counter is already at its maximum value.

Figure 6:
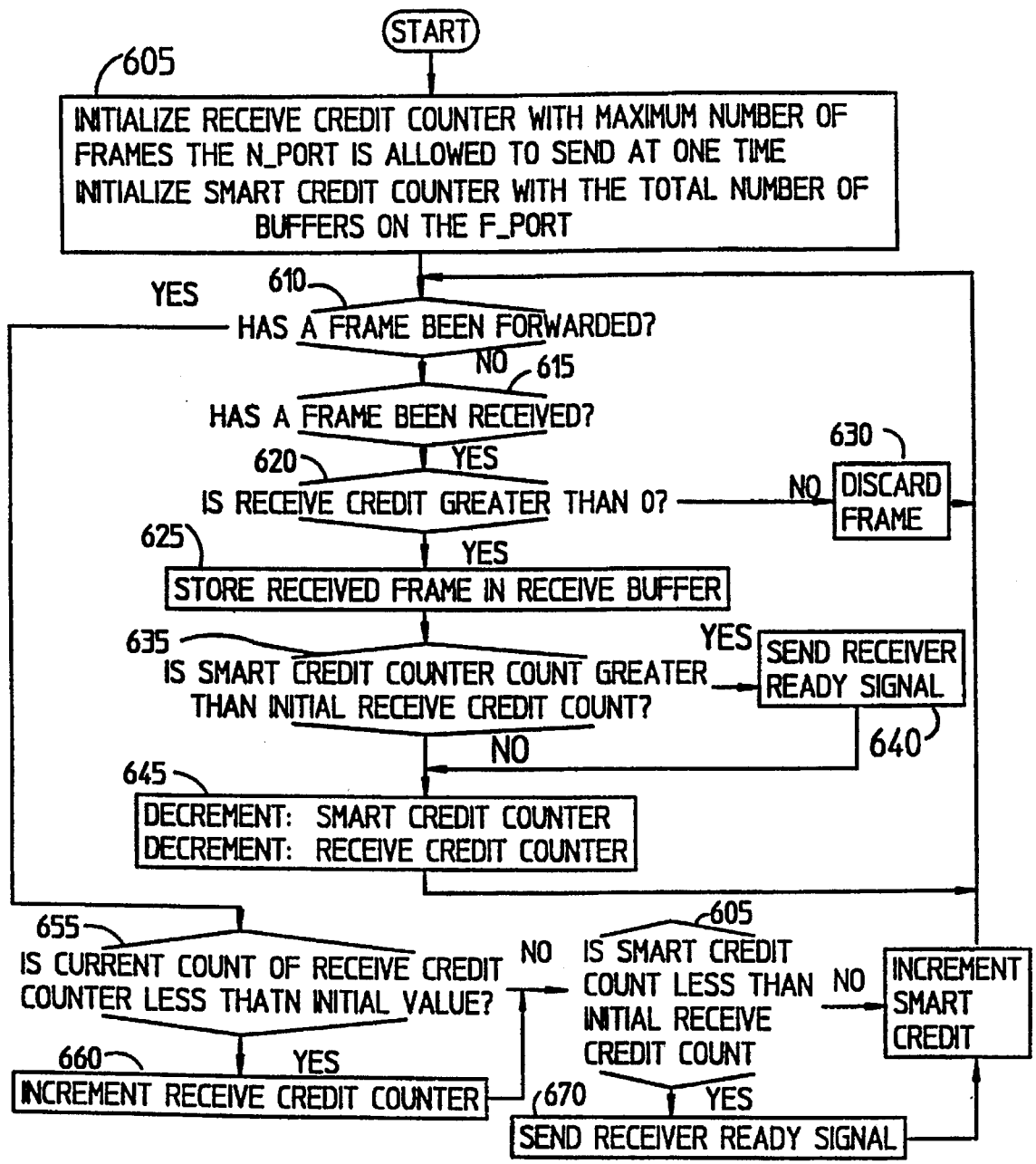
FIG. 6 shows a flow chart of the smart credit method for tracking buffer availability in accordance with the preferred embodiment of the invention from the perspective of the F_port.

FIG. 6 is a flow chart illustrating the smart credit method for tracking buffer availability from the F_port's perspective. At step 605, the receive credit counter is initialized at a value corresponding to the maximum number of frames the N_port is allowed to send at one time, and the smart credit counter is initialized with a value up to the total number of receive buffers on the F_port. At step 610, a determination is made as to whether a frame has been forwarded out of the F_port indicating that a receive buffer is available to receive a new frame transmitted by an N_port. If no, then at step 615 a determination is made as to whether any frames have been received. If yes, then at step 620, a determination is made whether the receive credit is greater than 0. If yes, then the frame is stored in a receive buffer (step 625). If no, then there has been an error and the transmitted frame is discarded (step 630) and there is a return to step 610 to determine whether any frames have been forwarded out of the F_port freeing up a receive buffer. After a frame has been stored (step 625), a determination is made as to whether the smart credit counter count is greater than the initial receive credit count (step 635). If it is, a receiver ready signal is sent immediately (step 640). In either case, the smart credit counter is then decremented (at step 645) and then there is a return to step 610. If no, then there is a return to step 610.

If at step 610, a determination is made that a frame has been forwarded from a receive buffer on the F_port to another F_port for transmitting to a destination N_port, then at step 655, a determination is made as to whether the current count of the receive credit counter is less than its initial value. If it is, then at step 660, the receive credit counter is updated. In either case, a determination is then made as to whether the smart credit counter is less than the receive credit count 665, if it is, then, then a receiver ready is sent 670. If the smart credit counter is equal to or greater than the receive credit count, or after the receiver ready is sent, then the smart credit counter is incremented (step 675). After which, there is a return to step 610 to determine whether a frame has been forwarded.

By increasing the number of frames that the path allocation system is aware of, the invention advantageously increases the probability that the path allocation system will be able to route frames between F_ports.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects. For example, the preferred embodiment has been described in reference to the Fibre Channel standard.

I claim:

1. A fibre channel switch apparatus for interconnecting a plurality of devices having node ports (N_ports), comprising:

a plurality of interconnected fabric ports (F_ports), each further comprising:
  a plurality of receive buffers for storing frames received from an N_port,
  a receive credit counter for counting the number of frames that the N_port is currently allowed to transmit at one time, and
  a smart credit counter for counting the number of receive buffers available to receive frames from the N_port, status/control logic on the F_port for transmitting a receiver ready signal to the N_port when the F_port is ready to receive another frame, the status/control logic further comprising:

a transmit credit counter located on each N_port for counting the number of frames that the N_port is currently allowed to transmit to the F_port at one time, wherein the transmit credit counter is decremented by one after a frame is transmitted to an F_port and incremented by one upon the receipt of the receiver ready signal.

2. The fibre channel switch apparatus as claimed in claim 1, wherein the transmit credit counter is initialized at login at a number corresponding to the maximum number of frames that the N_port can transmit to the F_port without receiving the receiver ready signal from the F_port.

3. The fibre channel switch apparatus as claimed in claim 2, wherein the N_port is only allowed to transmit a frame to the F_port if the transmit credit counter has a value greater than 0.

4. The fibre channel switch apparatus as claimed in claim 3, wherein each receive credit counter is initialized at login with an initial value defined as the login receive buffer-to-buffer credit (login rx_bb_credit) corresponding to the maximum number of frames that the N_port can transmit to the F_port at one time.

5. The fibre channel switch apparatus as claimed in claim 4, wherein the difference between the current value of the smart credit counter and the login receive buffer-to-buffer credit is the number of spare buffers on the F_port.

6. The fibre channel switch apparatus as claimed in claim 5, wherein, upon receipt of a frame, the current value of the smart credit counter is compared to the login receive bufferto-buffer credit, and if the smart credit counter value is greater than the login receive buffer-to-buffer credit, the status control logic sends the receiver ready signal to the N_port, and wherein, both the receive credit counter and the smart credit counter are decremented by one upon receipt of the frame.

7. The fibre channel switch apparatus as claimed in claim 6, wherein upon receipt of the receiver ready signal, the transmit credit counter is incremented.

8. The fibre channel switch apparatus as claimed in claim 6, wherein upon receipt of a frame:

if the value of the smart credit counter is less than or equal to the login receive buffer-to-buffer credit, then the number of available buffers is limited to the current count of the receive credit counter, and wherein, both the receive credit counter and the smart credit counter are decremented by one upon receipt of the frame, and wherein, the receiver ready signal is generated and sent to the N_port upon forwarding the frame to another F_port.

9. The fibre channel switch apparatus as claimed in claim 8, wherein upon forwarding the frame to another F_port, the smart credit counter and the receive credit counter are incremented as long as the current count of the receive credit counter is less than the initial value of the receive credit counter.

10. A method for transmitting frames from a plurality of node ports (N_ports) to their associated fabric ports (F_ports) for forwarding to other interconnected F_ports, comprising the steps of:

transmitting a frame from an N_port to its associated F_port, storing the transmitted frame in a plurality of receive buffers at the associated F_port prior to forwarding to an interconnected F_port, counting a receive credit count at each F_port that corresponds to the number of frames that an N_port is currently allowed to transmit to its associated F_port at one time, counting a smart credit count at each F_port that corresponds to the number of receive buffers available on an F_port to receive frames, transmitting a receiver ready signal from an F_port to its associated N_port when the F_port has forwarded a frame to another F_port, counting a transmit credit count at each N_port corresponding to the number of frames that an N_port is currently allowed to transmit to its associated F_port at one time, decrementing an N_port transmit credit count by one upon transmitting a frame from the N_port, and incrementing the transmit credit count by one when the N_port receives a receiver ready signal.

11. The method for transmitting frames as claimed in claim 10, further comprising the step of:

initializing each transmit credit count at login to a number corresponding to the maximum number of frames that the associated N_port can transmit to the F_port without receiving a receiver ready signal from an F_port.

12. The method for transmitting frames as claimed in claim 11, wherein an N_port is only allowed to transmit a frame to an F_port if the N_ports transmit credit count has a value greater than 0.

13. The method for transmitting frames as claimed in claim 12, further comprising the step of:

initializing each receive credit count at login with an initial value defined as the login receive buffer-to-buffer credit (login rx_bb_credit) corresponding to the maximum number of frames that the N_port can transmit to the F_port at one time.

14. The method for transmitting frames as claimed in claim 13, further comprising the step of:

comparing an F_ports login receive buffer-to-buffer credit count to the current value of the smart credit count upon receipt of a frame, sending a receiver ready signal immediately to the associated N_port, if the smart credit count value is greater than the login receive buffer-to-buffer credit, and decrementing the F_ports receive credit count and the F_ports smart credit count by one upon receipt of the frame.

15. The method for transmitting frames as claimed in claim 14, further comprising the step of:

incrementing an F_ports transmit credit count upon receipt of a receiver ready signal, wherein the associated N_port may now send an extra frame to the F_port.

16. The method for transmitting frames as claimed in claim 15, further comprising the step of:

comparing the count of the F_ports smart credit count to the login receive buffer-to-buffer credit count upon receipt of a frame, wherein if the smart credit count is less than or equal to the buffer-to-buffer credit count, then the number of available buffers on the F_port is limited to the F_ports current receive credit count, and generating a receiver ready signal and sending it to the N_port upon forwarding the frame to another F_port, decrementing both the receive credit count and the smart credit count by one.

* * * * *